United States Patent [19]

Hayashi

[11] Patent Number: 4,809,837

[45] Date of Patent: Mar. 7, 1989

[54] CONTROL DEVICE FOR A VENDING MACHINE AND GIFT CERTIFICATE FOR USE THEREON

[75] Inventor: Yukichi Hayashi, Sakado, Japan

[73] Assignee: Kabushiki Kaisha Nippon Coinco, Tokyo, Japan

[21] Appl. No.: 16,972

[22] Filed: Feb. 26, 1987

Related U.S. Application Data

[63] Continuation of Ser. No. 721,573, Apr. 10, 1985, abandoned.

[30] Foreign Application Priority Data

Apr. 16, 1984 [JP] Japan .................. 59-75022

[51] Int. Cl.$^4$ .............................................. G07F 7/02
[52] U.S. Cl. ................................... 194/205; 194/207; 194/210; 194/214; 235/381; 364/479
[58] Field of Search ............... 194/210, 205, 214, 211, 194/207; 235/375, 380, 381; 364/479

[56] References Cited

U.S. PATENT DOCUMENTS

| | | | |
|---|---|---|---|
| 3,242,929 | 3/1966 | Adams | 133/2 |
| 3,357,530 | 12/1967 | Yamamoto et al. | 194/4 R |
| 3,379,295 | 3/1968 | Varley | 194/4 R |
| 3,397,763 | 8/1968 | Wahlberg | 194/4 R |
| 3,653,480 | 4/1972 | Yamamoto et al. | 194/4 R |
| 3,896,915 | 7/1975 | Hayashi et al. | 194/1 N |
| 3,935,933 | 2/1976 | Tanaka et al. | 194/4 R |
| 3,984,660 | 10/1976 | Oka et al. | 235/381 |
| 4,124,109 | 11/1978 | Bissell et al. | 194/4 R |
| 4,185,730 | 1/1980 | Roes et al. | 194/4 R |
| 4,499,982 | 2/1985 | Sugimoto et al. | 194/1 N |
| 4,499,985 | 2/1985 | Schuller | 194/217 |

Primary Examiner—Joseph J. Rolla
Assistant Examiner—Edward S. Ammeen
Attorney, Agent, or Firm—Spensley Horn Jubas & Lubitz

[57] ABSTRACT

This gift certificate has information recorded thereon for identifying a total face value vendible by the gift certificate and a predetermined base amount equal to or smaller than the total face value. The information recorded on a deposited gift certificate is read by a reading device. A validation device validates the total face value and the base amount of the deposited gift certificate in response to the read information. A vending permission judgement device prohibits, in reponse to an output of the validation device, at least vending of an article to which a vend price below the base amount has been assigned. By virtue of this arrangement, a purchaser of an article from a vending machine by using a gift certificate is not forced to make purchase of the entire total face value but has only to make purchase above the base amount in which case a change preferably is paid out.

7 Claims, 4 Drawing Sheets

CONTROL DEVICE FOR A VENDING MACHINE AND GIFT CERTIFICATE FOR USE THEREON

This is a continuation of copending application Ser. No. 721,573 filed on Apr. 10, 1985, abandoned.

BACKGROUND OF THE INVENTION

This invention relates to a control device for a vending machine and a gift certificate for use in the vending machine and, more particularly, to a gift certificate with an improved system of recording money amount information.

A gift certificate is generally used on the condition that it is exchanged in its entire face value with an article (single piece or plural pieces) of a price equivalent to the total face value of the gift certificate. In a case where a gift certificate is used in a vending machine, however, it is desirable that more flexibility should be introduced in the manner in which it can be used. One problem arises when an article is out of stock in a vending machine. Since a warning lamp indicating that an article is out of stock is not lighted unless the article is entirely out of stock, if a gift certificate capable of purchasing plural pieces of the article in package is deposited when only one piece of the article is left in the vending machine, it is physically impossible to dispense the article by such system according to which vending of the article corresponding to the total face value of the gift certificate in package is made. It is therefore necessary for using a gift certificate in the vending machine without trouble to discard the idea of using it for vending in package and adopt a system capable of permitting more or less free vending within the range of the face value of the gift certificate.

In this case, if vending not reaching the face value of the gift certificate has been made, difference should be returned as change. If, however, vending requiring payment of change is permitted without limitation in using a gift certificate, it will readily bring about shortage of change coins in the vending machine.

It is therefore an object of the invention to provide a control device for a vending machine for use of a gift certificate which has eliminated the above described problem and also provide a gift certificate for use in a vending machine which can be used advantageously for overcoming the above problem. More specifically, it is an object of the invention to enable vending for a partial amount of the face value of the gift certificate and paying difference as a change so that, if a gift certificate corresponding to the number of pieces of an article exceeding the number of the article available for dispensing has been deposited when the article is nearly running out of stock, the amount of money corresponding to the undispensable number of the article is not forfeited without vending while occurrence of shortage of change coins which tends to occur readily in such partial vending is prevented.

SUMMARY OF THE INVENTION

For achieving the above object, it is a feature of this invention to establish a predetermined lower limit money amount as a condition of permitting vending by using a gift certificate and provide vending permission judgement means for prohibiting vending of an article whose price is below this lower limit money amount. For enabling many kinds of gift certificates to be used and enabling the vending machine to cope with change in vend price which occurs from time to time, it is not desirable that the lower limit money amount should be fixed within the vending machine. It is therefore an important feature of the invention to incorporate information of such lower limit money amount in the gift certificate and cause the vending machine to read the lower limit money amount information with respect to each gift certificate deposited for utilizing the read information as basis of judging whether vending should be permitted or not.

It is a feature of the gift certificate for use in a vending machine according to the invention to have information for identifying the total face value which is vendible and a predetermined base amount below the total face value recorded in a state in which the information can be read by a predetermined reading device. This base amount is utilized as the lower limit money amount for the vending permission judgement. Both this base amount and the total face value may be any desired amount depending upon the kind of the gift certificate. Information to be recorded specifically on the gift certificate need not be the total face value and the base amount themselves but has only to be one by which these amounts can be identified. If, for example, the base amount corresponds to the price of a single piece of the article and the total face value corresponds to the price of one or plural pieces of the article, the information to be recorded on the gift certificate may be composed of information representing the number of pieces of the article and information representing the base amount. In this case, the base amount can be identified by the base amount information of the base amount and the number of pieces of the article. Conversely, the piece number information and the total face value information may be directly recorded on the gift certificate. In this case, not only the total face value can be identified but also the base amount can be identified by dividing the total face value by the number of pieces of the article.

It is a feature of the control device of the vending machine according to the invention to comprise reading means for reading information recorded on the gift certificate upon deposition of the gift certificate in the vending machine, validation means for validating the total face value and the base amount in response to reading output of the reading means and vending permission judgement means for prohibiting vending of at least an article of a price below the base amount validated by the validation means, The vending permission judgement means preferably prohibits vending of an article of a price below the base amount on the condition that the total face value is not equal to the base amount.

According to the invention, by prohibiting vending of an article of a price below the base amount by the vending permission judgement means, a vend price corresponding to the base amount can be made the lower limit of permissible vending. By this arrangement, purchase equivalent to or exceeding the base amount becomes obligatory but purchase equivalent to the total face value in package does not become obligatory. If, accordingly, the base amount is equivalent to the price of one piece of an article, purchasing of at least one piece of the article corresponding to the gift certificate is obligatory but purchasing of more pieces of the article is not obligatory. Consequently, vending of an article of a price lower than one piece of the article designated by the gift certificate is not permitted so that payment of a large amount of change which is likely to result from vending of such low price article and resulting shortage of change coins can be effectively prevented. Besides, since purchasing of the total face value in package is not required, a gift certificate can be used in a flexible manner similar to money and the trouble that the total face value is forfeited without dispensing an article in case of shortage of the article can be eliminated.

Further, by establishing the lower limit on the condition that the total face value and the base amount are not equivalent to each other, such establishment of the lower limit is not made when the two amounts are equivalent to each other so that purchasing of an article of a price below the total face value, i.e., the base amount, can be made.

In the specification and claims of this application, the "gift certificate" is not limited to one on which the name of an exchangeable article is specified and which is exchangeable only with the specified article but it includes one on which no particular article is specified but only a value is indicated or one on which the name of an article is specified but which is exchangeable with any article available for vending by the vending machine within the indicated value. In short, the term "gift certificate" means all types of sheet-like substance which are guaranteed to be usable substitution for money in a specific vending machine.

BRIEF DESCRIPTION OF THE DRAWINGS

In the accompanying drawings.

DESCRIPTION OF PREFERRED EMBODIMENTS

An embodiment of the invention will now be described in conjunction with the accompanying drawings.

Figure 1:
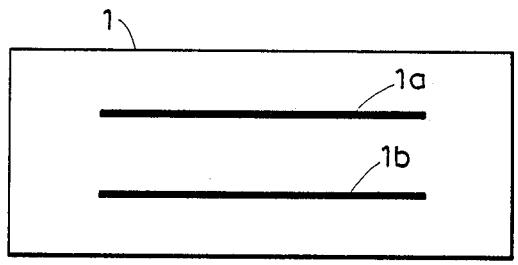
FIG. 1 is a plan view showing schematically an embodiment of a gift certificate according to the invention.

Referring to FIG. 1 which shows an example of the gift certificate according to the invention, the gift certificate is made of paper as is well known and the name, price and the number of pieces of an exchangeable article and other necessary items are visibly indicated on the gift certificate as in the known manner. Aside from these visible indications, information for identifying a vendible total face value and a predetermined base amount below the total face value is recorded on the gift certificate 1 in a state in which the information can be read by suitable means such as magnetic or optical or mechanical means. In FIG. 1, illustration of the visible indications is omitted while an example of tracks 1a, 1b in which the above mentioned information is recorded is illustrated. Description will be made hereunder on the assumption that, by way of example, information of the base amount is recorded in the track 1a and information of the number of pieces of the article corresponding to the base amount which is vendible by the gift certificate 1 is recorded on the gift certificate 1. The number and location of the tracks 1a, 1b for recording information may be changed as desired.

Figure 2:
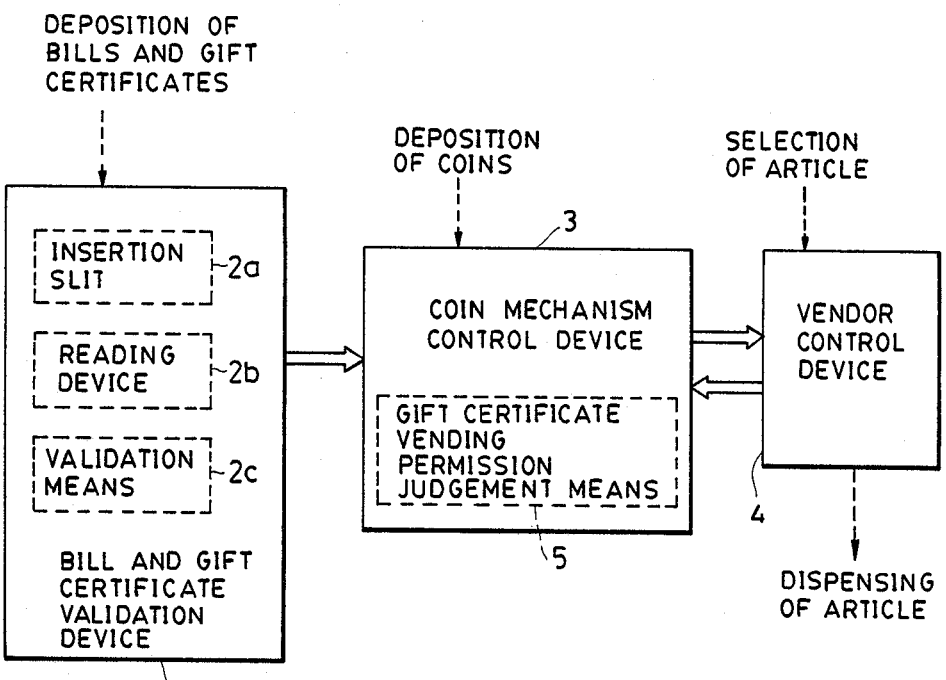
FIG. 2 is a block diagram showing schematically an entire construction of a vending machine incorporating the invention.

FIG. 2 is a block diagram showing schematically the entire construction of the vending machine incorporating the invention. A bill and gift certificate validation device 2 is a bill validation means which has been known as "bill validator". The bill and gift certificate validation device 2 includes an insertion slit 2a, a reading device 2b for reading a state of a deposited bill or information recorded on a deposited gift certificate. In this embodiment, the insertion slit 2a and the reading device 2b including a reading head and sensor etc. are used commonly both for a bill and a gift certificate so that a bill and a gift certificate may be mixedly inserted in the common insertion slit 2a. The bill and gift certificatate validation device 2 can be readily constructed in the same manner as the known bill validator and so detailed description thereof will be omitted. The bill and gift certificate validation device 2 reads the information recorded in the tracks 1a, 1b of the deposited gift certificate 1 by means of the reading device 2b, validates the read information by validation means 2c, delivers a signal corresponding to the validated information to a coin mechanism control device 3 and also delivers a signal representing the amount of the deposited bill to the coin mechanism control device 3. An arrangement is of course provided for discriminating a false bill or gift certificate from a true one and reject the false one.

The coin mechanism control device 3 has known control functions relating to a coin changer of a vending machine such as a function of judging whether an article is vendible or not on the basis of the amount of deposited money and gift certificate, a function of calculating the amount of deposited money and gift certificate and the amount of change and a function of controlling the change payout. Gift certificate vending permission judgement means 5 relating to the invention is included in this coin mechanism control device 3.

A vendor control device 4 is provided for controlling dispensing of an article selected by a purchaser when this article has been judged vendible by the coin mechanism control device 3.

The vending machine according to the invention is capable of performing continuous vending, i.e., a change is not paid out immediately by a single vending but paid out only when a clear switch (not shown) has been pushed or a predetermined continuous vending finishing condition has been achieved.

Figure 3:
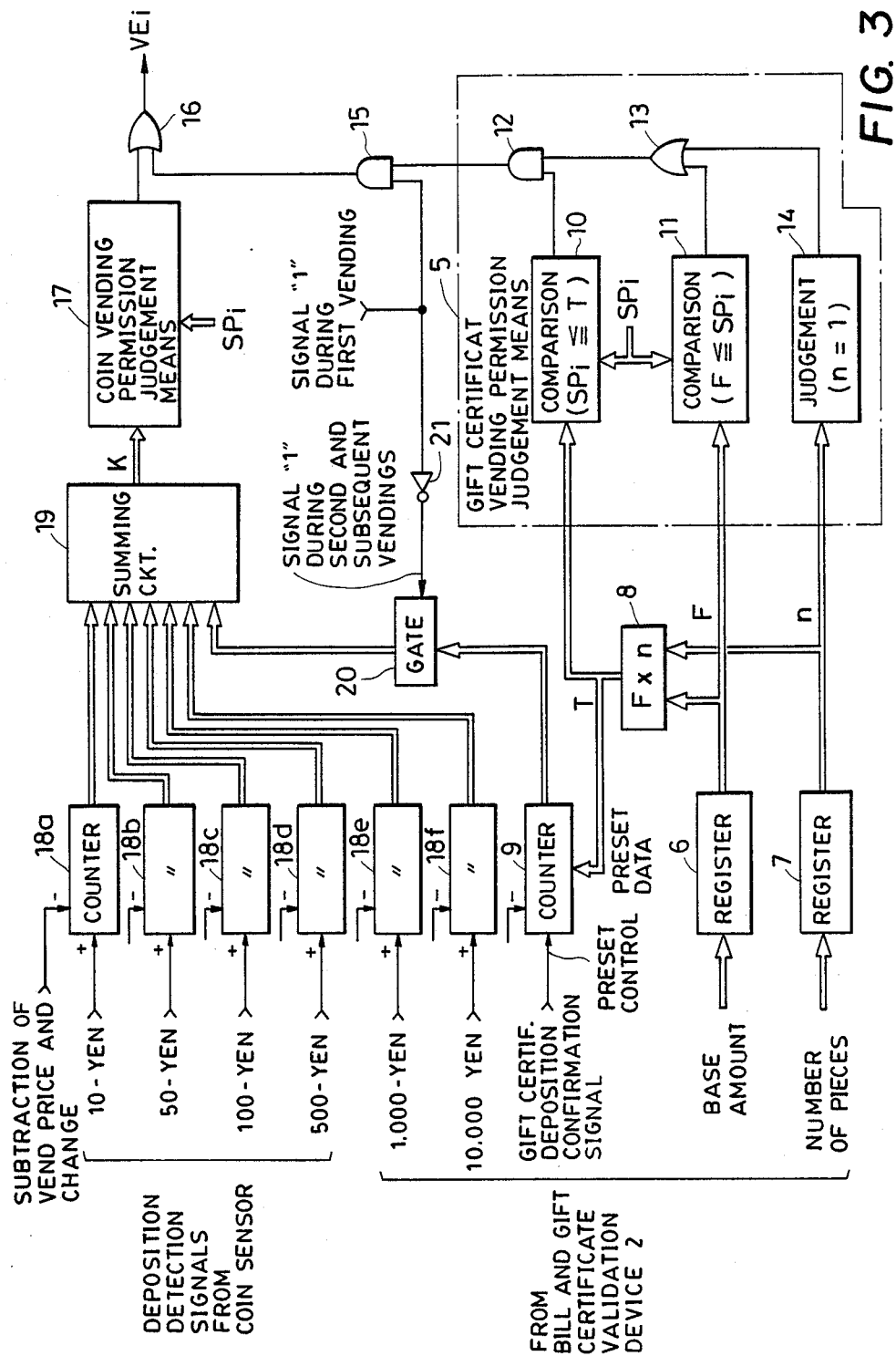
FIG. 3 is an electrical block diagram showing an embodiment of the control device of the vending machine according to the invention which is included in the coin mechanism control device shown in FIG. 2.

FIG. 3 shows an embodiment of the control device according to the invention. This control device is included in the coin mechanism control device 3 of FIG. 2.

Data representing a base amount F of a deposited gift certificate which has been read and validated by the gift certificate validation device 2 and data representing the number of pieces n are respectively stored in registers 6 and 7. A multiplier 8 multiplies the stored data F and n stored in the registers 6 and 7 to calculate a total face value $T=nF$ of the deposited gift certificate. This multiplier 8 constitutes a part of means for validating the total face value on the basis of information recorded on the gift certificate 1. The calculated total face value T is preset in a gift certificate amount counter 9. This presetting is controlled by e.g. a gift certificate deposition confirmation signal.

The gift certificate vending permission judgement means 5 examines whether the relation $F \leq SP_i \leq T$ is achieved or not on the basis of the total face value T, the base amount F and vend price $SP_i$ of the article and, when this condition has been achieved, permits vending of the article of the vend price $SP_i$. Alternatively stated, the judgement means 5 prohibits vending of an article whose price is below the base amount F. A first comparison circuit 10 receives data of the total amount T calculated by the multiplier 8 and data of the vend price $SP_i$ and produces an output "1" when $SP_i \leq T$. A second comparison circuit 11 receives data of the base amount F and the data of the vend price $SP_i$ and produces an output "1" when $F \leq SP_i$. The output of the first comparison circuit 10 and the output of the second comparison circuit 11 which has passed an OR gate 13 are applied to an AND gate 12 and a signal "1" representing permission of vending is produced from the AND gate 12 when the above condition $F \leq SP_i \leq T$ has been achieved. In this manner, the first comparison circuit 10 establishes the upper limit of a price which is vendible by the gift certificate and the second comparison circuit 11 establishes the lower limit thereof.

A judgement circuit 14 receives data of the number of pieces n stored in the register 7 and detects whether a condition $n=1$ exists or not. When $n=1$, the circuit 14 produces a signal "1" and supplies this signal to the AND gate 12 via the OR gate 13 whereas when $n \neq 1$, the circuit 14 produces a signal "0". Accordingly, when $n=1$, the judgement of the lower limit by the second comparison circuit 11 is nullified and a vending permission signal is generated from the AND gate 12 in accordance only with the judgement of the upper limit by the first comparison circuit 10. In other words, the vending prohibition judgement with respect to the vend price $SP_i$ below the base amount F by the second comparison circuit 11 is made on the condition $n \neq 1$, i.e., the total face value T is not equal to the base amount F. Since it is not desirable from the standpoint of securing flexibility in the manner of using a gift certificate to prohibit vending of an article of the vend price $SP_i$ which does not satisfy the condition $F \leq SP_i$ i.e., an article having the vend price $SP_i$ which is $F > SP_i$, when $T=F$ i.e., $n=1$, vending of the article of $F > SP_i$ is permitted only when $T=F$. It should be noted, however, that if the main concept of the present invention, i.e., to conduct the vending permission judgement utilizing the base amount F as the lower limit money amount, is to be carried out, the judgement circuit 14 and the OR gate 13 are unnecessary and the output of the second comparison circuit 11 may be directly applied to the AND gate 12.

The output of the AND gate 12 is applied to an OR gate 16 via an AND gate 15. The AND gate 15 is provided for enabling the gift certificate vending permission judgement means 5 only during a first vending after deposition of the gift certificate 1 and receives a signal representing the first vending at other input thereof. Accordingly, the AND gate 15 is enabled while vending permission judgement concerning the first vending after deposition of the gift certificate is performed and when achievement of the condition $F \leq SP_i \leq T$ has been confirmed by the comparison circuits 10 and 11 during this period of time, the output signal "1" of the AND gate 12 is gated out of the AND gate 15 and supplied to the OR gate 16 as the vending permission signal.

The OR gate 16 synthesizes the vending permission signal from the gift certificate vending permission judgement means 5 with the vending permission signal from coin vending permission judgement means 17 to form a vending permission signal $VE_i$ and supplies this signal $VE_i$ to the vendor control device 4.

The coin vending permission judgement means 17 is provided separately from the gift certificate vending permission judgement means 5 so that a usual vending permission judgement on the basis of the amount of deposited coins is made by this judgement means 17. As is well known, deposition number counters $18a$–$18f$ are provided for respective denominations of money. The counters $18a$–$18d$ for coins are counted up by respective deposition detection signals for the respective denominations of coins (e.g., 10-yen, 50-yen, 100-yen and 500-yen). The counters $18e$ and $18f$ for bills are respective denominations of bills detection signals for the respective denominations of bills (e.g., 1,000-yen and 10,000-yen). The outputs of the respective counters $18a$–$18f$ are supplied to a summing circuit 19 in which a total deposited amount K is calculated.

The coin vending permission judgement means 17 compares the total deposited amount K with the vend price $SP_i$ and generates, in principle, a vending permission signal with respect to the vend price $SP_i$ about which the condition $K \geq SP_i$ is satisfied. Vending conditions may be restricted in accordance with availability of change coins in the known manner. Vending conditions may also be restricted in accordance with whether or not a preliminarily calculated expected amount of change can be paid out by amounts of stored change coins by denominations, as was disclosed in the specification of the U.S. Pat. No. 4,499,982. Such additional restriction on the vending conditions may be established not only by the coin vending permission judgement means 17 but by the first comparison circuit 10 of the gift certificate vending permission judgement means 5.

The summing circuit 19 is adapted to be capable of including not only the amount of deposited coins but also the amount of a deposited gift certificate in the total deposited amount K. The count output of the gift certificate amount counter 9 is supplied to the summing circuit 19 via a gate 20. The gate 20 is controlled by a signal obtained by inverting the signal indicated the first vending after deposition of the gift certificate by an inverter 21, the gate being closed during the first vending but being opened during the second and subsequent vendings. During the first vending therefore, the summing circuit 19 calculates only the amount of deposited coins and the judgement means 17 performs the vending permission judgement on the basis of the deposited amount K owing to the coins. As was described above, the gift certificate vending permission judgement means 5 is enabled at this time so that the vending permission judgement with respect to coins and the vending permission judgement with respect to the gift certificate are performed independently from each other. During the second and subsequent vendings, the gift certificate vending permission judgement means 5 is nullified as described above but the vending permission judgement is performed on the basis of the total amount K of the amount of the deposited coins and the amount of the gift certificate.

Each time a single vending is made, the amount corresponding to the vend price is subtracted (collected) by the counter 9 or the counters 18a-18f by control of money collection and change control means (not shown). Accordingly, the amount K which is calculated in the summing circuit 19 during the second and subsequent vendings is a sum of balance of the deposited coins and gift certificate. Various methods are conceivable for collecting money. For example, the collection (subtraction) can be made preferentially from the gift certificate amount counter 9 and then preferentially from a lower denomination one of the counters 18a-18f. The method of collection is of course not limited to this. The collection is thus made in each vending and when a clear switch (not shown) is finally operated, a control is made so that the balances of the respective counters 9 and 18a-18f are paid out as change.

Figure 4:
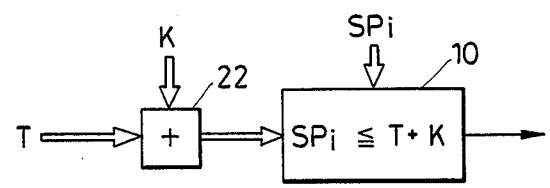
FIGS. 4 through 7 are electrical block diagrams showing respectively modified examples of the device of FIG. 3.

In the embodiment shown in FIG. 3, the base amount for the vending permission judgement in the gift certificate vending permission judgement means 5 is the amount of the gift certificate only. Alternatively, the amount of the deposited coins may be added to the amount of the gift certificate. An example of this is shown in FIG. 4. In FIG. 4, an adder 22 is provided in a prior stage of the first comparison circuit 10 and the data of the total face value K from the multiplier 8 and the data of the deposited amount K from the summing circuit 19 are added together in the adder 22. Accordingly, the condition of judgement in the first comparison circuit 10 becomes $SP_i \leq T+K$ and the vending permission judgement with the upper limit of the sum $T+K$ of the amount K of the deposited coins and the total face value T of the gift certificate.

Figure 5:
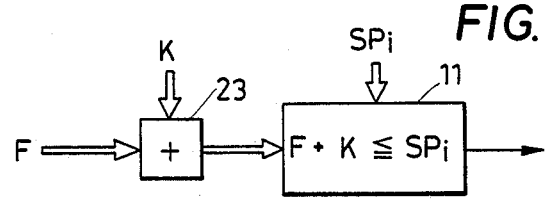

FIG. 5 shows an example in which an adder 23 is provided in a prior stage of the second comparison circuit 11 and the sum of the base amount F from the register 6 and the amount K of the deposited coins from the summing circuit 19 is applied to the comparison circuit 11. In this case, the condition of judgement in the second comparison circuit 11 becomes $F+K \leq SP_i$ and the vending permission judgement with the lower limit of the sum $F+K$ of the base amount F and the amount K of the deposited coins is performed.

In the embodiment of FIG. 3, either one or both of the modifications shown in FIGS. 4 and 5 may be adapted.

Figure 6:
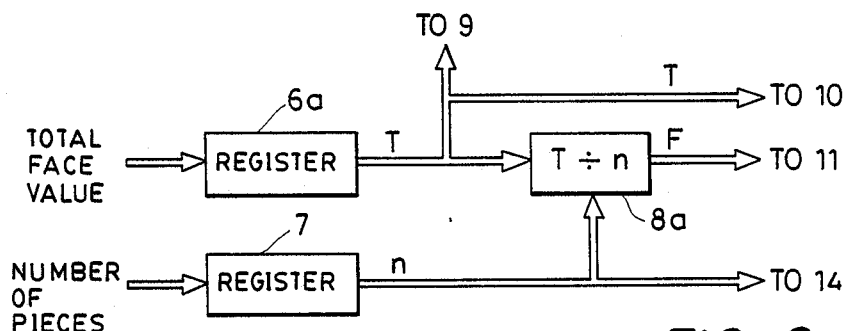

In a case where the information of the total face value T and the information of the number of piece n are recorded on the gift certificate 1, the portion including the register 6 and the multiplier 8 in FIG. 3 may be modified as shown in FIG. 6. In FIG. 6, a register 6a stores the data of the total face value T and this data T and the data n stored in the register 7 are applied to a divider 8a for effecting division $T \div n = F$ to obtain the base amount F.

Figure 7:
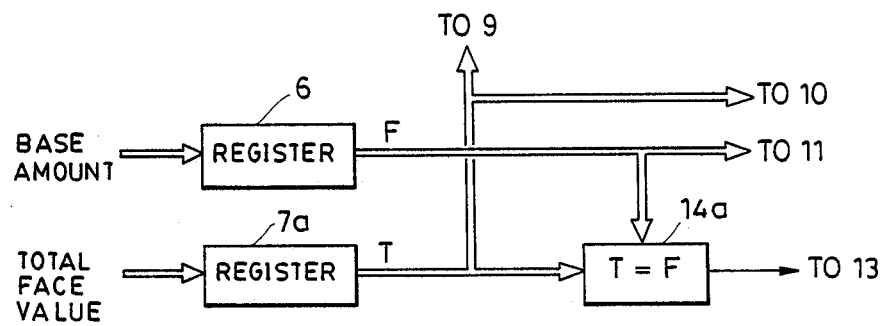

In a case where the total face value T and the base amount F are recorded on the gift certificate 1, the portion including the registers 6 and 7, the multiplier 8 and the judgement circuit 14 may be substituted by a circuit as shown in FIG. 7. In this circuit, the data of the total face value T is stored in a register 7a and this data is supplied directly to a preset input of the counter 9 and also to the first comparison circuit 10. The data F and T stored in the registers 5 and 7a are compared in the judgement circuit 14 and a signal "1" is produced when $F=T$.

The base amount F need not necessarily correspond to a price of one piece of the article but may correspond to a price of two, three or more pieces of the article. The total face value T need not be an integer multiple of the base amount F. The base amount F need not correspond to the price of the article and T and F may be arbitrarily determined upper limit and lower limit amounts.

If the control device of the vending machine is constructed of a microcomputer, the above described embodiment can of course be realized by a software program and such construction is also within the scope of the invention.

Figure 8:
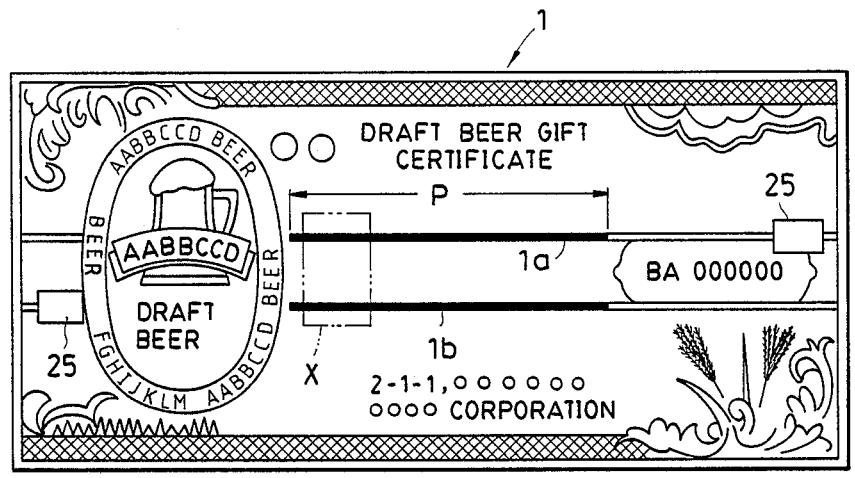
FIG. 8 is a plan view showing schematically a specific example of the gift certificate according to the invention with visible indications on the surface thereof.
Figure 9:
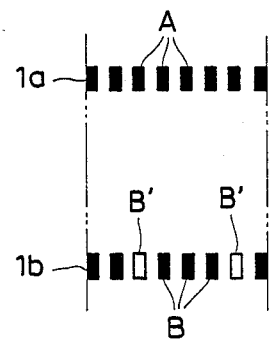
FIG. 9 is a diagram showing in an enlarged scale an example of a portion designated by a reference character X in FIG. 8.

FIG. 8 shows a specific example of the gift certificate 1 according to the invention. The gift certificate 1 has the name of article, the name of corporation which has issued the gift certificate, a reference number, a decorative design etc. indicated visibly and in a designed fashion. The tracks 1a, 1b in which necessary information is recorded are provided within a range P in the central portion of the certificate 1. FIG. 9 shows the tracks 1a, 1b in an enlarged scale. The first track 1a consists of information units A arranged at a regular interval of 1.05 mm, each information unit A being made of a magnetic ink printed in a rectangular shape with a vertical length of 2 mm and a transverse length of 1.05 mm. The second track 1b consists of information units B of the same dimensions as the information units A arranged in a similar manner to the information units A. The track 1b however is different from the track 1a in that blank units B' are formed by deleting the information units B at selected locations. Various necessary data are stored by forming of these blank units B'. The first track 1a has no special information recorded therein (since there is no blank units B') and the first track 1a is used for receiving a regular reference signal in reading the information. Although not illustrated in detail, each of the information units A and B is composed of four fine lines of 0.15 mm arranged in parallel with an interval of 0.15 mm.

Figure 10:
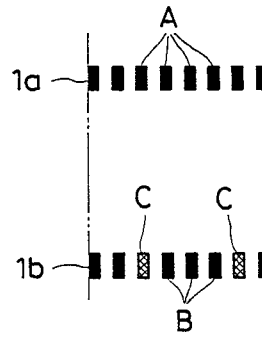
FIGS. 10, 11 and 12 are respectively diagrams showing in an enlarged scale other examples of the portion designated by X.

Since the second track 1b consists of the information units B and the blank units B', it can be visibly noticed that some information is contained in the second track 1b if the certificate 1 is observed carefully. This gives rise to a likelihood that the arrangement of the information units B in the second track 1b is counterfeited for illegal use. For eliminating the possibility of such illegal use, an arrangement is made in this embodiment such that, as shown in FIG. 10, the information contained in the second track 1b is disguised by adding disguising information units C printed with a non-magnetic ink at locations of the blank units B' in the second track 1b.

Figure 11:
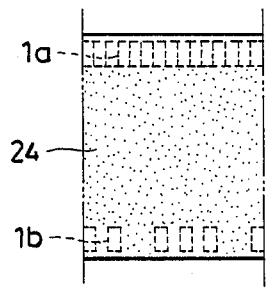
Figure 12:
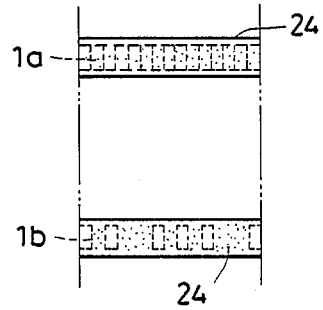

The work of additionally printing the disguising information units C with non-magnetic ink at locations corresponding to the blank units B' in the second track 1b is difficult because the information unit consists of very fine lines so that this work will incur a high manufacturing cost. Besides, offsetting of the disguising information units from proper locations which can occur in printing thereof will clearly indicate that they are disguising information units and in this case the addition of the disguising information units will lose its intended effect. For overcoming such disadvantages, the first track 1a and the second track 1b may be covered commonly or separately, as shown in FIG. 11 or 12, with a covering layer 24 made of, e.g., a non-magnetic ink of a silver color so that it will appear as if it was a sort of design.

In FIG. 8, a reference character 25 designates a light passing section which corresponds to a portion of a bill in which printing is absolutely made. By providing such light passing section 25, it can be found immediately that a depostied substance is not a bill but a gift certificate upon detection of this light passing section 25 by a photosensor.

As has been described in detail above, according to the present invention, information of the lower limit money amount for permissible vending is recorded in the gift certificate and the control device reads this information to perform the vending permission judgement using this money amount (base amount) as the lower limit. This construction enables vending of an article of a vend price below a total face value of a gift certificate thereby affording more flexibility to the vending by using a gift certificate while it prevents occurrence of shortage of change coins by prohibiting vending of an article of a vend price below the lower limit money amount (base amount). Further, by recording information concerning such lower limit money amount in the gift certificate, the hardware of the control device can be used for all types of gift certificates and can be used in such a manner that it can cope readily with change in prices of the gift certificates.

I claim:

1. A control device for a vending maching comprising:
   reading means for reading, responsive to deposition of a gift certificate, information recorded on the gift certificate, said gift certificate having information recorded thereon for identifying a total face value, which is the maximum amount purchasable by the gift certificate, and a base amount, whch is the minimum amount purchasable by the gift certificate, the base amount being an amount equal to or smaller than the total face value;
   validation means, responsive to an output of said reading means, for validating the total face value and the base amount on the basis of said information recorded on the deposited gift certificate and for producing, in instances including situations wherein the base amount is greater than zero and smaller than the total face value, a signal representing the total face value and the base amount;
   selection means for selecting one or more articles vendible from the vending machine; and
   vending permission judgement means, responsive to the produced signal of said validation means, for allowing vending of a selected collection of one or more articles to which a total vend price in a range from the base amount to the total face value has been assigned and for prohibiting vending in cases where a collection of one or more articles is selected to which a total vend price outside of said range has been assigned, said cases including situations wherein the base amount is greater than zero and smaller than the total face value.

2. A control device for vending machine comprising:
   reading means for reading, responsive to deposition of a gift certificate, information recorded on the gift certificate, said gift certificate having information recorded thereon for identifying a total face value vendible by the gift certificate and a predetermined base amount equal to or smaller than the total face value;
   validation means responsive to an output of said reading means for validating the total face value and the base amount on the basis of said information recorded on the deposited gift certificate; and
   vending permission judgment means responsive to an output of said validation means for prohibiting vending of at least an article to which a vend price below the base amount has been assigned;
   wherein said vending permission judgment means prohibits vending of an article of a vend price below the base amount on the condition that the total face value and the base amount validated by said validation means are not equal to each other.

3. A control device as defined in claim 2 wherein said vending permission judgement means comprises:
   a first comparison means for comparing the total face value T with the vend price $SP_i$ to examine whether a condition $SP_i \leq T$ has been satisfied or not;
   a second comparison means for comparing the base amount F with the vend price $SP_i$ to examine whether a condition $F \leq SP_i$ has been satisfied or not; and
   means for generating a vend permission signal if the comparison conditions of said first and second comparison means have both been satisfied when the total face value is not equal to the base amount and generating a vending permission signal if the comparison condition of said first comparison means has been satisfied when the total face value is equal to the base amount.

4. A control device as defined in claim 3 wherein
   said gift certificate has information representing the base amount and information representing a number of piece corresponding to a quotient resulting from dividing the total face value by the base amount respectively recorded thereon;
   said validation means validates the base amount and the number of piece on the basis of the information which has been read by said reading means and validates the total face value by product of the base amount and the number of piece; and
   said vending permission judgement means judges whether the total face value is equal to the base amount or not depending upon whether the number of piece n is n=1 or n≠1.

5. A control device for a vending machine comprising:
   reading means for reading, responsive to deposition of a gift certificate, information recorded on the gift certificate, the gift certificate having information recorded thereon for identifying a total face value vendible by said gift certificate and a predetermined base amount equal to or smaller than the total face value;
   validation means responsive to an output of said reading means for validating the total face value and the base amount on the basis of said information recorded on the deposited gift certificate;
   first vending permission judgement means responsive to an output of said validation means for prohibiting in a first vending after deposition of the gift certificate, vending of at least an article to which a vend price below the base amount has been assigned;
   second vending permission judgement means for performing a vending permission judgement on the basis of an amount of deposited money in the first vending and performing a vending permission judgement on the basis of a sum balance of a deposited amount left after subtracting a vend price of a preceding vending from a sum of the amount of deposited money and the total face value of the gift certificate in a second and subsequent vendings; and means for generating a vending permission signal in the first vending when either of said first and second vending permission judgement means has judged that vending is permissible and generating a vending permission signal in the second and subsequent vendings in response to a result of vending permission judgement by said second vending permission judgement means, nullifying the judgement by said first vending permission judgement means.

6. A control device as defined in claim 5 wherein said first vending permission judgement means prohibits vending of an article of a vend price below a sum of the amount of deposited money and the base amount.

7. A control device as defined in claim 5 wherein said first vending permission judgement means performs a vending permission judgement using a sum of the amount of deposited money and the total face value as an upper limit.

* * * * *